(12) United States Patent
Drouart et al.

(10) Patent No.: US 6,412,310 B1
(45) Date of Patent: Jul. 2, 2002

(54) APPARATUS FOR GRAVITY FEEDING POWDER TO A PLASMA TORCH FOR MANUFACTURING GLASS FIBER PERFORMS

(75) Inventors: Alain Drouart, Nanterre; Benoît Gouez, Acheres; Pierre Ripoche, Pithiviers, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/525,482

(22) Filed: Mar. 15, 2000

Related U.S. Application Data

(62) Division of application No. 09/070,871, filed on May 1, 1998, now Pat. No. 6,202,447.

(30) Foreign Application Priority Data

Feb. 5, 1997 (FR) .......................................... 97 05446

(51) Int. Cl.$^7$ .......................................... C03B 37/018
(52) U.S. Cl. .......................................................... 65/391
(58) Field of Search .......................................... 65/391

(56) References Cited

U.S. PATENT DOCUMENTS

| 4,011,006 A | 3/1977 | Fleming, Jr. et al. ........... 65/39 |
| 4,265,649 A | 5/1981 | Achener ...................... 65/39.1 |
| 4,414,012 A | 11/1983 | Suto et al. .................... 65/18.2 |
| 4,767,429 A | 8/1988 | Fleming et al. ............... 65/3.11 |
| 4,872,895 A | 10/1989 | Fleming et al. ............... 65/18.1 |
| 5,004,488 A | 4/1991 | Mehrotra et al. ............. 65/17.6 |
| 5,279,633 A | 1/1994 | Fleming ....................... 65/17.4 |

FOREIGN PATENT DOCUMENTS

| EP | 0 719 738 A | 7/1996 |
| FR | 2 446 264 A | 8/1980 |
| GB | 2 134 896 A | 8/1994 |
| JP | 57-149733 | 9/1982 |

*Primary Examiner*—John Hoffmann
(74) *Attorney, Agent, or Firm*—Sughrue Mion, PLLC

(57) ABSTRACT

The invention relates to manufacturing glass fiber preforms. It relates to a method comprising rotating preform about its own axis, and displacing a plasma torch in translation relative to the preform in a direction parallel to the axis of the preform, the axes of the flame and of the preform and being offset by a certain distance, and then inserting glass powder into the plasma flame under gravity. According to the invention, the glass powder is accelerated before penetrating into the plasma flame by means of an accelerator gas, and the offset distance between the axes is reduced with increasing acceleration of the powder. The invention is applicable to manufacturing glass fibers, and in particular optical fibers.

5 Claims, 1 Drawing Sheet

APPARATUS FOR GRAVITY FEEDING POWDER TO A PLASMA TORCH FOR MANUFACTURING GLASS FIBER PERFORMS

This is a divisional of application Ser. No. 09/070,871, filed May 1, 1998, U.S. Pat. No. 6,202,447 the disclosure of which is incorporated herein by reference.

The invention relates to manufacturing glass fiber preforms, and in particular optical fiber preforms, and it relates in particular to a method and to apparatus making it possible specifically to increase the rate at which such preforms are manufactured.

BACKGROUND OF THE INVENTION

Document FR-A-2 253 723 describes a method of preparing a preform for an optical waveguide in which a plasma torch projects glass powder which is injected into the base of the flame by a carrier gas. A flow of carrier gas is created so as to move the glass powder along a substantially horizontal elongate path. More precisely, in the absence of carrier gas, the glass powder does not advance towards the plasma torch so the plasma flame does not contain glass powder. That constitutes a method of pneumatically injecting glass powder.

Also known, from document GB-A-2 134 896 is a method of manufacturing a preform which is similar to the method of the first-mentioned document. A mechanically measured quantity of silica glass powder is inserted into a central tube into which there are inserted in succession oxygen and hydrogen to form an oxygen-hydrogen torch flame, so that the powder is inserted into the torch before a flame is formed. That method therefore includes injecting glass powder upstream from the base of the flame and via the inside of the flame.

Document FR-A-2 446 264 describes a method of preparing a preform for an optical waveguide in which a circular section cylindrical preform is moved along its axis past the flame of a plasma torch, said flame extending horizontally. A feed duct having a sloping bottom length inserts silica glass powder under the action of gravity to the top of the flame so that the powder is entrained by the flame onto the preform. However, although that document indicates that the plasma torch can be oriented in several ways in a vertical plane perpendicular to the axis of rotation of the preform, the description states that the grains of glass "fall" into the flame of the plasma, which means that the plasma flame must have a significant component in a horizontal direction.

The disposition described in that document FR-A-2 446 264 is simpler than the dispositions described in the previous documents because the operations of conveying the glass powder and of forming the plasma flame are completely separated and because glass powder is fed solely under the action of gravity.

In general terms, the invention relates to a method of the type described in above-mentioned document FR-A-2 446 264 in that it implements a plasma flame that is directed towards a preform, together with a separate device for feeding powder under gravity. Nevertheless, in the method of the invention, the glass powder gravity feed normally takes place only at the edge of the plasma flame. In such a method, the quantity of glass powder inserted into the plasma and deposited on the primary preform is limited by the depth to which the powder penetrates into the plasma flame.

OBJECTS AND SUMMARY OF THE INVENTION

According to the invention, the drawback due to the limitation of powder penetration depth into the plasma flame is eliminated or at least greatly reduced by making available a method and apparatus in which the rate at which glass preforms are manufactured in a system using gravity feed and a plasma flame is increased by reinforcing the gravity feed with acceleration of the glass powder before it penetrates into the flame. This acceleration is obtained by using a gas for acceleration the powder in the terminal portion of the feed device.

More precisely, the invention provides a method of manufacturing glass fiber preforms, and in particular optical fiber preforms, the method being of the type which comprises rotating a cylindrical primary preform about its axis; moving a plasma torch in translation relative to the preform in a direction parallel to the axis of the preform, the axis of the plasma torch flame not intersecting the axis of the preform and being offset by a certain distance from the axis of the preform; and inserting glass powder by gravity into the plasma flame from outside the flame; according to the invention, the method comprises accelerating the glass powder inserted under gravity before it penetrates into the plasma flame by means of an accelerator gas inserted into the flow of glass powder advancing under gravity; and adjusting the offset distance between the axis of the plasma flame and the axis of the preform so that the offset distance between the axes is decreased as the acceleration of the powder is increased.

Preferably, the acceleration is adjusted by adjusting the flow rate of the accelerator gas to a value that is smaller than or equal to 15 l/min, with the glass powder feed rate possibly being as much as 90 g/min.

Advantageously, the method comprises, prior to insertion of the accelerator gas into the flow of glass powder, preparatory treatment of the accelerator gas. This preparatory treatment of the accelerator gas can be constituted, in particular, by preheating the accelerator gas, and/or by inserting doping material into the accelerator gas.

The invention also provides a method of manufacturing glass fiber preforms, the method being of the type comprising a plasma torch, a device for imparting relative displacement in translation between a primary preform and the flame of the plasma torch, and a device for feeding the plasma flame under gravity with glass powder from outside said flame; according to the invention, the gravity feed device includes a bottom length of a tube having an accelerator gas injection tube connected upstream therefrom.

Preferably, the axis of the accelerator gas injection tube and the axis of the bottom length of the feed device form an angle that is less than or equal to 30°.

Advantageously, the apparatus further includes a device for adjusting the accelerator gas flow rate.

In an advantageous embodiment, the apparatus further includes a device for performing preparatory treatment to the accelerator gas prior to the tube for injecting the accelerator gas into the flow of glass powder. Advantageously, the device for preparatory treatment of the accelerator gas is selected from the group comprising a device for preheating the accelerator gas and a device for inserting a doping material into the accelerator gas. Preferably, the accelerator gas is air.

In an advantageous embodiment, the apparatus further comprises a device for adjusting the distance between the axis of the plasma flame of the torch and the axis of a primary preform on which the glass fiber preform is formed.

BRIEF DESCRIPTION OF THE DRAWING

Other characteristics and advantages of the invention appear more clearly from the following description, given with reference to the accompanying drawing, in which.

MORE DETAILED DESCRIPTION

Figure 3:
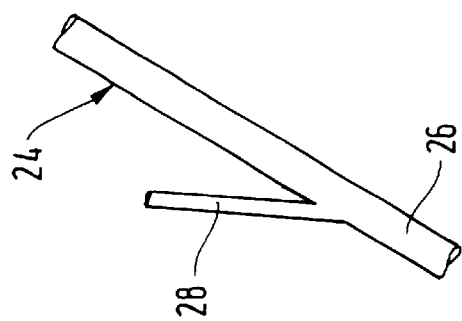
FIG. 3 is a diagrammatic section through a device suitable for implementing the method of the invention.
Figure 2:
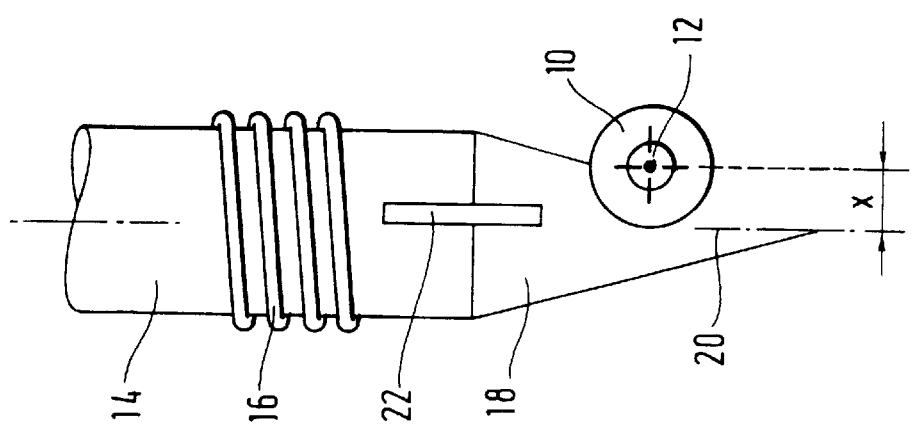
FIG. 2 is an end view of the apparatus shown in FIG. 1.
Figure 1:
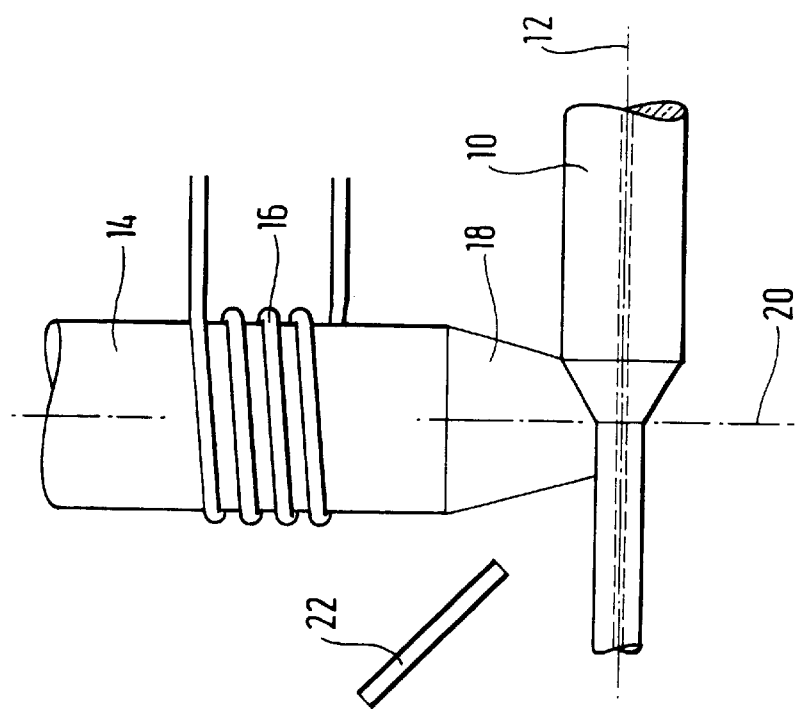
FIG. 1 is a diagrammatic side view in elevation showing apparatus for making a glass fiber preform by a method of feeding a plasma flame with glass powder by gravity.

FIGS. 1 and 2 show apparatus for manufacturing glass fiber preforms which can be used in a method of manufacturing preforms of the plasma torch type having gravity feed. More precisely, the glass fiber preform 10 is made on a primary preform of cylindrical shape and circular section which rotates about its own axis 12 and which moves parallel to its axis, from left to right in FIG. 1. From a plasma torch 14 which includes a tube surrounded by an induction heater winding 16, a flame 18 of plasma is projected towards the preform 10. The plasma flame has an axis 20.

Glass powder of particle size lying in the range 0.1 mm to 0.2 mm, for example, is inserted under gravity via a tube 22 from outside the plasma flame 18, above the preform 10. The powder grains which penetrate into the flame are melted and are applied to the preform whose diameter increases.

It will be observed in FIG. 2 that the axis 20 of the flame is offset from the axis 12 of the preform, these two axes being separated by a distance given reference x in FIG. 2.

The apparatus as described above, when used in the improvement of the invention, makes it possible to apply about 30 grams per minute (g/min) of glass powder at most with a plasma torch of power lying in the range 40 kW to 100 kW.

The invention relates to an improvement applied to the method and to the above-mentioned apparatus such that the rate at which preforms can be manufactured is increased by two or three times, at least.

To this end, with the apparatus as described with reference to FIGS. 1 and 2, the glass powder inserted under gravity into the plasma flame is accelerated so that it penetrates more deeply into the flame and thus a greater quantity of powder can be melted simultaneously in the plasma flame and applied to the preform 10. In order to obtain such a result, it is insufficient merely to increase the flow rate of the powder, since the powder does not penetrate far enough into the flame. Nor does it suffice, in order to obtain such a result, to use a pneumatic system for projecting the desired quantity of powder into the flame in a lateral direction, since such an embodiment would give rise to too great a quantity of powder carrier gas, thereby excessively cooling the flame and thus reducing its effect, and possibly giving rise to defects on the preform.

The invention thus implements feed merely by accelerating the gravity-fed powder, thus enabling a high feed rate to be obtained under steady conditions, while avoiding feed by pneumatically projecting powder since that gives rise to significant disturbance of the plasma flame and makes it very difficult to obtain steady conditions.

It has also been observed that it is not sufficient to insert a greater quantity of powder into the plasma flame as accelerated by a gas in order to obtain steady conditions that enable a preform to grow regularly, but that it is also necessary to adjust the position of the plasma flame relative to the preform as a function of the quantity of powder inserted therein.

More precisely, as shown in FIG. 2, the distance x between the axis 20 of the plasma flame and the axis 12 of the preform 10 under steady conditions has been measured both when powder is fed solely under gravity (spacing $x_0$), and secondly when the powder is accelerated by a glass powder conveying gas, giving rise to a consequential increase in flow rate. It has been observed that the distance x between the axes 20 and 12 decreases with increasing acceleration speed of the powder. However, it is important that the acceleration does not reach a value such that the accelerator gas gives rise to a mechanical effect on and to cooling of the flame to an excessive extent which would prevent a high quality preform 10 being obtained.

According to the invention, the flow of glass powder is preferably accelerated in the bottom length 26 of the ordinary gravity feed tube 24, by injecting an accelerator gas, e.g. air or argon, via a lateral duct 28. The lateral duct is preferably at a small angle relative to the usual duct 24, i.e. an angle of less than 30°. It is advantageous to use the kinetic energy of the gas and not its extra pressure effect.

In an implementation of the invention using the apparatus as described, a glass powder flow rate has been obtained that is as high as 90 g/min, with an accelerator air flow rate of no more than 15 liters per minute (l/min) for the same plasma torch power.

According to the invention, the distance x between the axes 12 and 20 is therefore adjusted as a function of the quantity of glass powder to be inserted. As a device for varying the distance x, the apparatus comprises a device that is already known for this purpose, e.g. rails on which wheels of the assembly for supporting the preform can run under the control of a motor.

It is also necessary for the accelerator gas to have appropriate properties. When the matter applied is silica glass powder, air is entirely suitable, however other gases may be used, such as inert gases. It is nevertheless necessary for the accelerator gas used to be of sufficient purity to obtain a glass preform that is not contaminated, or for it to contain only such impurity(ies) as are necessary for doping.

According to the invention, it is also advantageous for the glass powder accelerator glass also to serve to prepare the powder itself so as to facilitate manufacture of the preform. For example, the accelerator gas can perform treatment such as heating in order to preheat the glass powder. The gas can be heated, for example, by passing through a heat exchanger. In another example, the accelerator gas contains doping material which depends on the quantity of the layer of glass that is to be formed on the preform 10. It happens quite often that the preform is used for manufacturing fibers in which the refractive index varies progressively. Under such circumstances, it is necessary for the fiber to receive layers of varying refractive indices, possibly with intermediate stretching operations. According to the invention, this index variation can be obtained by modifying the composition of the accelerator gas; for example, the gas can have a varying concentration of a halogen compound.

The devices incorporated in the apparatus of the invention can be made in the same manner as devices having the same function in known apparatuses. For example, the gravity feed device may comprise a conventional manifold, the plasma torch may be of a type that is already known in this application, etc.

Finally, the grain size of the powders used can be the same as that which is normally used; for example the size of the particles may be of the order of a few tenths of a millimeter, e.g. 0.1 mm to 0.2 mm.

Naturally, the invention is described and shown merely by way of preferred example and any equivalent technique could be applied to its component elements without thereby going beyond its ambit.

What is claimed is:

1. An apparatus for manufacturing glass fiber preforms, comprising:

plasma torch;

a device for imparting relative displacement in translation between a primary preform and a plasma flame of the plasma torch; and a gravity feed tube for feeding the plasma flame under gravity with glass powder from outside said plasma flame, wherein the gravity feed tube includes a bottom length and an accelerator gas injection duct is connected upstream from the bottom length of the gravity feed tube for injecting an accelerator gas into a flow of the glass powder in the bottom length of the gravity feed tube.

2. An apparatus according to claim 1, wherein the axis of the accelerator gas injection duct and the axis of the bottom length of the gravity feed tube form an angle that is less than or equal to 30°.

3. An apparatus according to claim 1, further including, a device for performing preparatory treatment to the accelerator gas before the accelerator gas injection duct injects the accelerator gas into the flow of glass powder.

4. An apparatus according to claim 3, wherein the device for preparatory treatment of the accelerator gas is selected from the group comprising a device for preheating the accelerator gas and a device for inserting a doping material into the accelerator gas.

5. An apparatus according to claim 1, further comprising a device for adjusting the distance between the axis of the plasma flame of the plasma torch and the axis of the primary preform on which the glass fiber preform is formed.

* * * * *